United States Patent [19]

Rocca et al.

[11] Patent Number: 5,431,257
[45] Date of Patent: Jul. 11, 1995

[54] METHOD AND DEVICE FOR BRAKING, PARTICULARLY FOR BICYCLES, MOTORCYCLES, AND SMALL AUTOMOBILES

[75] Inventors: Philippe R. Rocca, Compiegne; Philippe D. Girard, Margny Les Compiegne, both of France

[73] Assignee: Notion de Progres, Compiegne, France

[21] Appl. No.: 157,399

[22] Filed: Nov. 26, 1993

[30] Foreign Application Priority Data

Nov. 26, 1992 [FR] France ................. 92 14237

[51] Int. Cl.⁶ ..................... B62L 3/02; F16D 65/18
[52] U.S. Cl. ..................... 188/24.21; 188/24.19; 188/73.41
[58] Field of Search ............... 188/24.12, 24.14, 24.15, 188/24.19, 24.21, 72.1, 72.2, 72.9, 73.37, 73.41, 25, 344

[56] References Cited

U.S. PATENT DOCUMENTS

| | | | |
|---|---|---|---|
| 3,114,434 | 12/1963 | Pletscher | 188/24.14 |
| 3,809,187 | 5/1974 | Grieve | 188/24.14 |
| 4,055,235 | 10/1977 | Tanaka et al. | 188/24.14 |
| 5,168,962 | 12/1992 | Yoshigai | 188/24.14 |

FOREIGN PATENT DOCUMENTS 2591976 6/1987 France .

*Primary Examiner*—Robert J. Oberleitner
*Assistant Examiner*—Chris Schwartz
*Attorney, Agent, or Firm*—Jacobson, Price, Holman & Stern

[57] ABSTRACT

A method and device for braking a moving or movable element such as a wheel, particularly in two-wheeled vehicles, where a force is applied to a moving element (5) by at least one frictional element such as a brake pad (30), whereby a compression force is produced acting along a given braking surface (30a) of the pad tending to retard movement of the movable element, so that beginning with a predetermined adjustable threshold value of the compression force controlled by a spring device (16, 17, 20) the surface area of contact between the brake pad and moving element is reduced correspondingly but does not become zero as long as braking is necessary.

17 Claims, 4 Drawing Sheets

METHOD AND DEVICE FOR BRAKING, PARTICULARLY FOR BICYCLES, MOTORCYCLES, AND SMALL AUTOMOBILES

BACKGROUND OF THE INVENTION

The invention relates to the braking of vehicles, particularly two-wheeled vehicles, by immobilization or retarding action on a moving element such as a wheel, a disc, or a brake drum.

Considering, e.g., the case of a bicycle or motorcycle, known braking devices include control levers mounted on the handlebars and intended to control the action of a plurality of brake pads by means of cables or rods. In general, one brake pad is provided on each side of a wheel, each pair of pads being held by a support furnished with means for pressing the pads against the wheel in order to retard or stop rotation of the wheel.

When the control levers are actuated they cause displacement of the pads toward the rotating moving element(s), until the element(s) are more or less vigorously engaged based on the force applied with the control levers. In this way the pads are brought into and out of contact with the moving element(s); i.e., the initial braking engagement is an all-or-nothing action.

The braking force is adjusted by applying greater or lesser compression force to the control levers; this results in a greater or lesser compression force on the moving element(s).

The force exerted on the rotating moving elements(s), such as a wheel or wheels, for example, is represented more or less directly by a force on the rolling surface of the wheel(s).

While the kinematics and control means remain constant for a given machine, the same is not true of the rolling surface, which virtually always shows constant variation. A blacktop surface has spots of gravel on it, a dry surface has some puddles of water, smooth grass suddenly gives way to mud, etc.

Accordingly, an actuating action on the braking system which may be correct at a given instant may be dangerous at the next instant, and in practice it may not be possible to continuously adjust the force on the control levers by observing the ground. Moreover, conditions which apply to the front wheel may not be applicable to the rear wheel.

Consequently, particularly with regard to the control of braking of the front wheel, not only is there a danger of skidding and loss of control, but the rider may actually be spilled, e.g., by being swung over the handlebars. This is particularly dangerous in the case of a motorcycle or all-terrain vehicle (ATV).

To remedy the problem of locking of the wheels in the case of automobiles there is a known braking system referred to commercially as "ABS", in which sensors employed on the customary automotive brake discs transmit certain information to an electronic circuit whereby the brake pads are retracted from the brake disc before the wheel locks, and then are reapplied into contact with the disc; and this alternating action is continued.

The cycle of exertion of pressure on the brake pads to engage the disc, followed by release of such pressure, is very rapid, enabled by the electronic assistance system. It is much more rapid than if the operator attempted to control the braking himself by applying and then releasing the brake pedal a plurality of times in succession, which technique is sometimes referred to in practice as "pumping the brakes".

The ABS braking system thus enables one to avoid locking of the wheels of the vehicle and to achieve particularly effective and rapid braking over a shorter distance.

However, the ABS braking system is not adaptable to every case, particularly for two-wheeled vehicles in which light weight and low cost are objectives.

Means of improving braking of two-wheeled vehicles based on the idea of pumping the brakes have already been considered.

French Patent No. 2,591,976 provides for complete release of the brake pads with complete suppression of contact between the pad the wheel. This has the serious drawback that the cyclist unconsciously compensates for the total loss of braking by keeping the control lever under compression, thereby rendering the system ineffective, because once an adjustment is made to the gap between the brake pad and the wheel the device returns to the initial braking position, such that the special device only serves at best to retard the locking of the wheel and not to prevent it.

U.S. Pat. No. 4,055,235 is also known, which describes a device intended to increase the braking force.

BRIEF SUMMARY OF THE INVENTION

An object of the present invention is to provide a device and method for braking which enables one to avoid sudden locking of a wheel and spilling of the operator but which generally improves the effectiveness of braking.

In contrast to the above cited French Patent, the present invention provides for continuous braking contact with automatic control of the change between maximum and minimum contact, and does not result in either locking of the wheel or complete release of the brake. Also, in the cited French Patent, the braking is momentarily suppressed, whereas according to the present invention the braking is only modified.

The operation in the cited U.S. Patent to increase the braking force is exactly the opposite of the present invention.

Toward this end, a principal aspect of the invention is a method of braking a moving element such as a wheel, particularly on a two-wheeled vehicle, characterized in that a force is applied to the moving element by means of at least one friction element, whereby a compression force is produced which acts along a given contact surface, so that beginning with a predetermined threshold value of this force the surface area of contact is reduced correspondingly but does not become zero as long as braking is necessary.

According to a feature of this method, the friction element is pivotally mounted such that when in contact with the moving element and affected by the rotation of the moving element the friction element is displaced angularly with respect to the moving element, thereby causing a change in the value of the surface area of contact, and the friction element is subjected to an opposing elastic force which provides equilibration.

A further principal aspect of the invention is a braking device, particularly for two-wheeled vehicles, of a type having at least one brake pad movably mounted between an inactive position in which it is held at a small distance from a moving element such as a wheel and an active position in which it is in contact with the moving element. Means are provided for advancing each brake pad from the inactive position to the active position, and vice versa, characterized in that each brake pad is also mounted so as be pivotable between an incipient braking position in which it is parallel to the moving element and generally in contact with the moving element over the entire nominal surface of the pad and a position in which the pad forms an angle with respect to the moving element and is in contact with the moving element over a surface area which is substantially less than its nominal surface area, including an elastic opposing element urging each brake pad toward the active position of the pad.

According to other features of this device:
  each brake pad is rigidly connected to a rod which is associated with a piece which is pivotally mounted between an initial position in which the brake pad is in an active position parallel to the moving element and a position in which the brake pad forms an angle with the moving element;
  the pivoting piece is associated with elastic return means;
  the return means includes a spring, an elastic piece, particularly a solid piece comprised of an elastomer material, means for setting a basic value of the compression force exerted on the brake pad, and means setting the initial compression of the spring via control elements.

BRIEF DESCRIPTION OF THE DRAWINGS

The invention will be better understood with the aid of the detailed description hereinbelow in the nature of an illustrative example (not intended to limit the scope of the invention), with reference to the accompanying drawings wherein.

DETAILED DESCRIPTION

Figure 1:
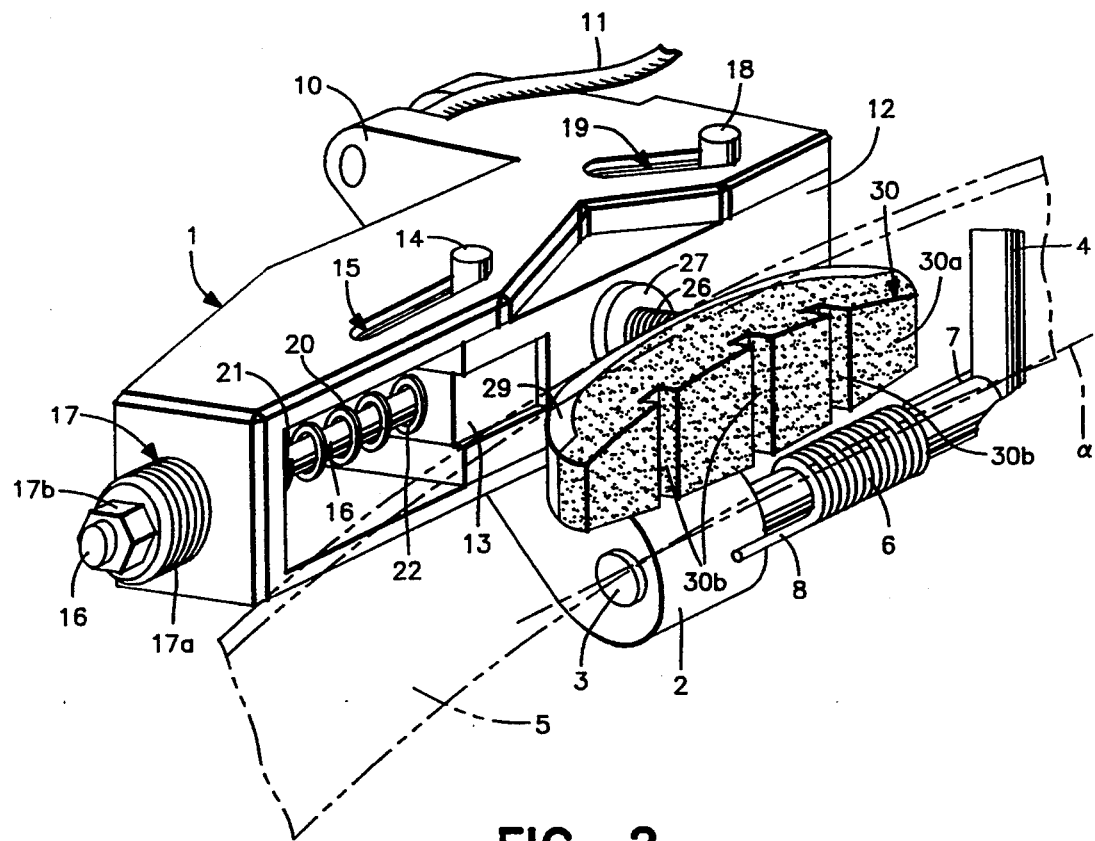
FIG. 1 is a schematic perspective view of a device according to the invention showing a brake head with associated control elements in an inactive position in which the brake pad is disposed a short distance from one rim of a wheel of a bicycle and thereby exerts no braking action.

The inventive device will be described hereinbelow using the example of a bicycle such as an all-terrain bicycle. However, it is obvious that other applications may be envisioned, such as in disc or drum brakes for any type of vehicle.

In the description hereinbelow reference will be made to a device having only one brake head, whereas in reality generally two brake heads are present which act in caliper fashion [or otherwise in opposed fashion]. Thus it is implicit that the invention is applicable to devices having one or more brake heads.

The inventive brake device as illustrated in the drawings has a housing 1 having a tubular part 2 by which the housing is pivotally mounted around a generally horizontal pivot axis α via a fixed pivot pin 3 which is part of the frame of a bicycle which includes a vertical member 4. The housing 1 is positioned in the immediate vicinity of the rim 5 of a wheel which rim is shown in phantom so as not to hide the various elements of the device.

A helicoidal spring 6 is disposed around the pivot pin 3, with the ends 7, 8 of spring 6 extended out parallel to the axis α and abutting against the upright 4 and the tubular part 2 when spring 6 is placed under torsional force. The function of the spring is to return the housing 1 to its inactive position disposed at a distance from the rim of the wheel 5. This arrangement for retracting the brake head may be replaced by other equivalent retracting means within the knowledge and capability of a person skilled in the art.

At the opposite end of the housing from pivot 3 a yoke 10 is disposed to which one end of a cable 11 is fastened, the other terminus of the cable being connected to a control lever of known type (not shown).

The means by which cable 11 is fastened to the housing 1 via the yoke 10, and to the control lever, are not part of the present invention and are known to one having ordinary skill in this art.

The housing 1 contains two moving parts which are interconnected. A piece 12 is pivotally mounted on a piece or block member 13, around a circular pin 14, for guiding and pivoting, engaged in an opening 15 of the housing 1. Piece 13 in turn is mounted so as to be slidable via a rod 16 engaged in a piece 17 which guides rod 16 in rectilinear movement; rod 16 is further guided via pin 14 which is itself guided by the opening 15 which extends parallel to the axis of the rod 16.

Piece 17 has a radially exteriorly threaded part 17a which is engaged in a threaded tap in the housing 1, and piece 17 further has a part 17b which is radially interiorly smooth to provide for sliding of the rod 16. A hexagonal head on piece 17 outside the housing enables piece 17 to be screwed inward or outward with respect to housing 1.

The pivoting piece 12 bears a circular pin 18 for guiding and pivoting which engages in a rectilinear opening 19 of the housing 1 which opening is at an oblique angle to the axis of the rod 16.

A helical return spring 20 is disposed around rod 16. At one end 21, spring 20 abuts against the tubular part 17, and at the other end 22 it abuts against the sliding piece 13, such that spring 20 is compressed as piece 13 moves toward piece 17 and is extended as piece 13 moves away from piece 17, so as to constantly urge sliding piece 13 away from piece 17, i.e., into a position where piece 13 is farthest from piece 17.

Pivoting piece 12 is traversed by a smooth bore 25 in which a threaded rod 26 extends which is associated with the positioning and adjusting elements 27 and 28. Rod 26 is rigidly connected to a mount or shoe 29 for a brake pad 30 comprised of any suitable material for contacting the rim of the wheel 5.

Given this arrangement, the devising of equivalent embodiments is within the capability of one skilled in the art. For example, the material of the paid 30 can be molded onto an insert which is rigidly attached to the rod 26, thereby eliminating the mount or shoe 29.

The device functions as described below, and for clarity with reference to a plan view of the rim of the wheel, the device being disposed laterally of and facing the upper part of the rim 5, for the description relating to FIGS. 1 and 2, and 5–8. A front view of rim 5 is assumed for FIGS. 3 and 4, with rim 5 being vertical and the device again being disposed at the region of the top of and laterally of rim 5.

Figure 2:
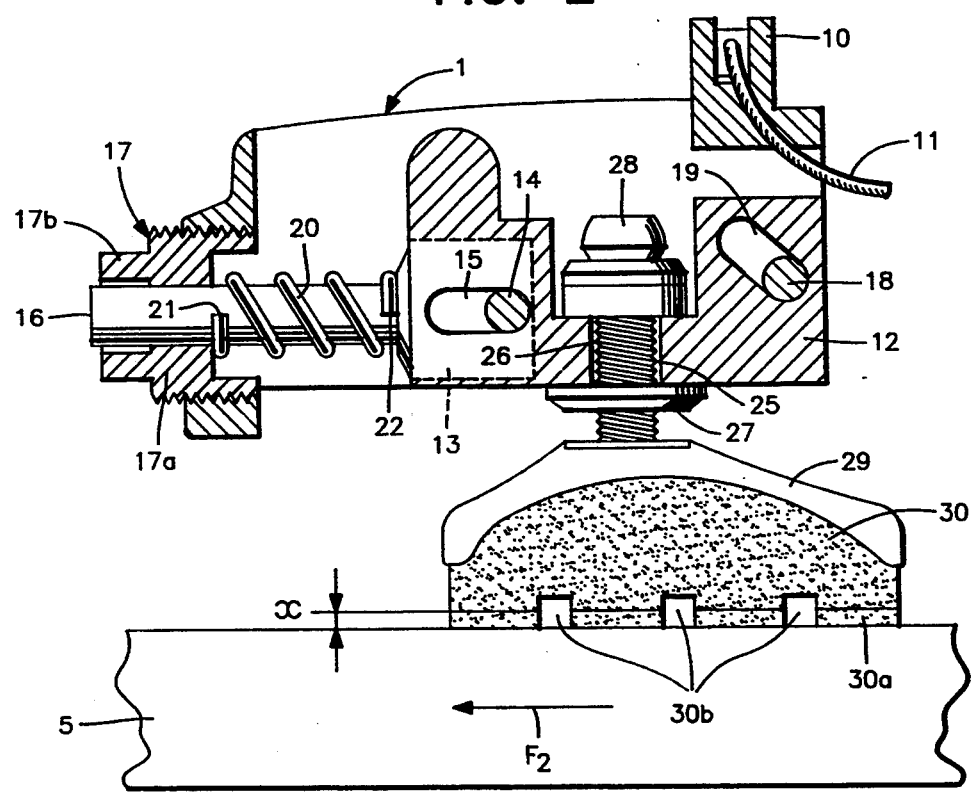
FIG. 2 is a schematic top plan view of FIG. 1 partially in cross section.
Figure 3:
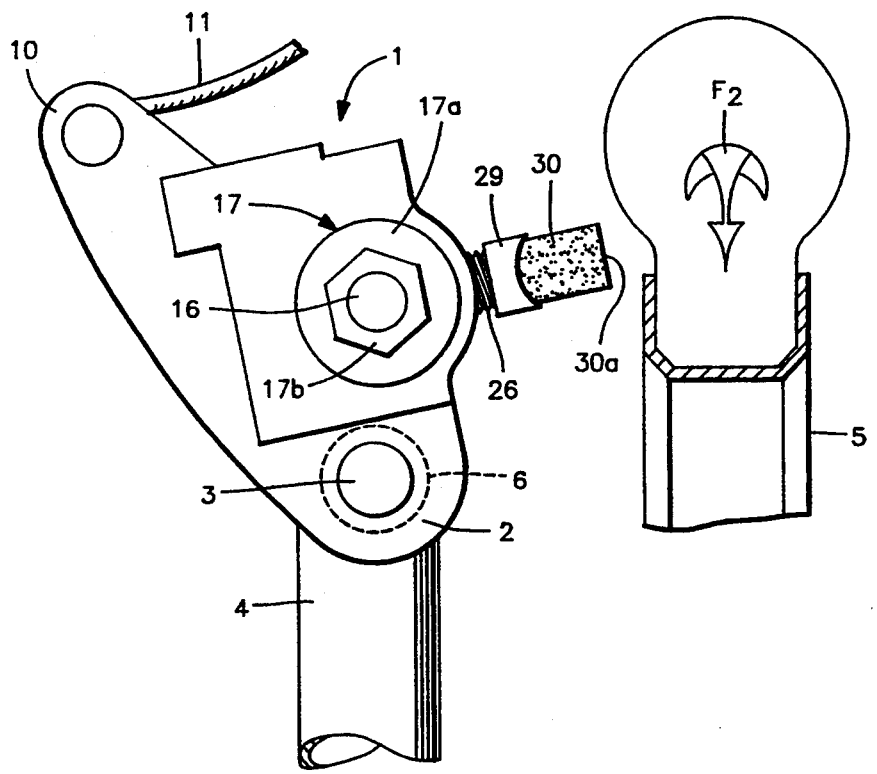
FIGS. 3 and 4 are two schematic front elevational views of the invention, showing the transition from an inactive position of the device to an active position, respectively.

In the "rest" position illustrated in FIGS. 1–3 the braking system is inactive. The spring 6 urges the housing 1 to remain stable in an angular position centered at axis α such that the pad 20 is disposed at a short distance x from the rim 5. Cable 11 is shown relaxed, because the user is deemed not to be engaging the control lever.

The spring 20 repels the sliding piece 13, and pivot pin 14 is at the farthest end of opening 15 from piece 17, wherewith the pivoting piece 12 is urged into an orientation where the rod 26 which it bears is disposed perpendicularly to the plane of the rim 5 [(in the plan view of FIG. 2)], wherewith, however, the active face 30a of the pad 30 is in fact disposed obliquely with respect to said plane of rim 5 (FIG. 3). (In the plan view of the system (FIGS. 1–2), the active face 30a of the pad 30 is parallel to the plane [sic] of the rim 5.)

When the user desires to apply the brake, he actuates the control lever which applies tension to the cable 11 along arrow F1 and causes housing 1 to pivot with respect to axis α, around the fixed pivot pin 3.

Figure 4:
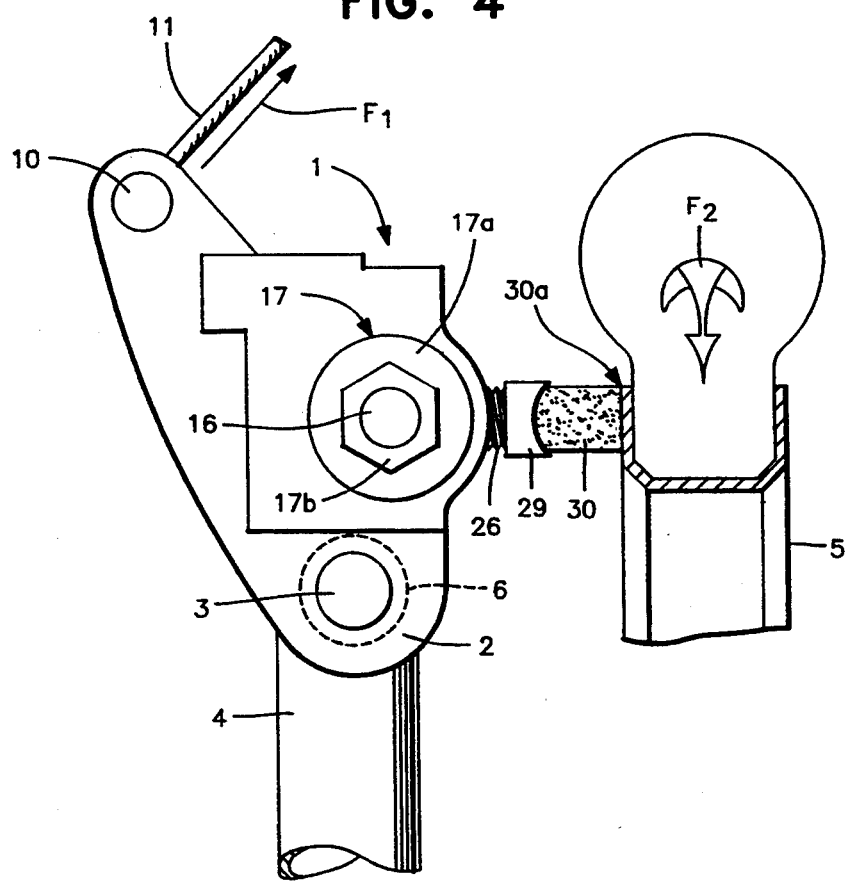
Figure 5:
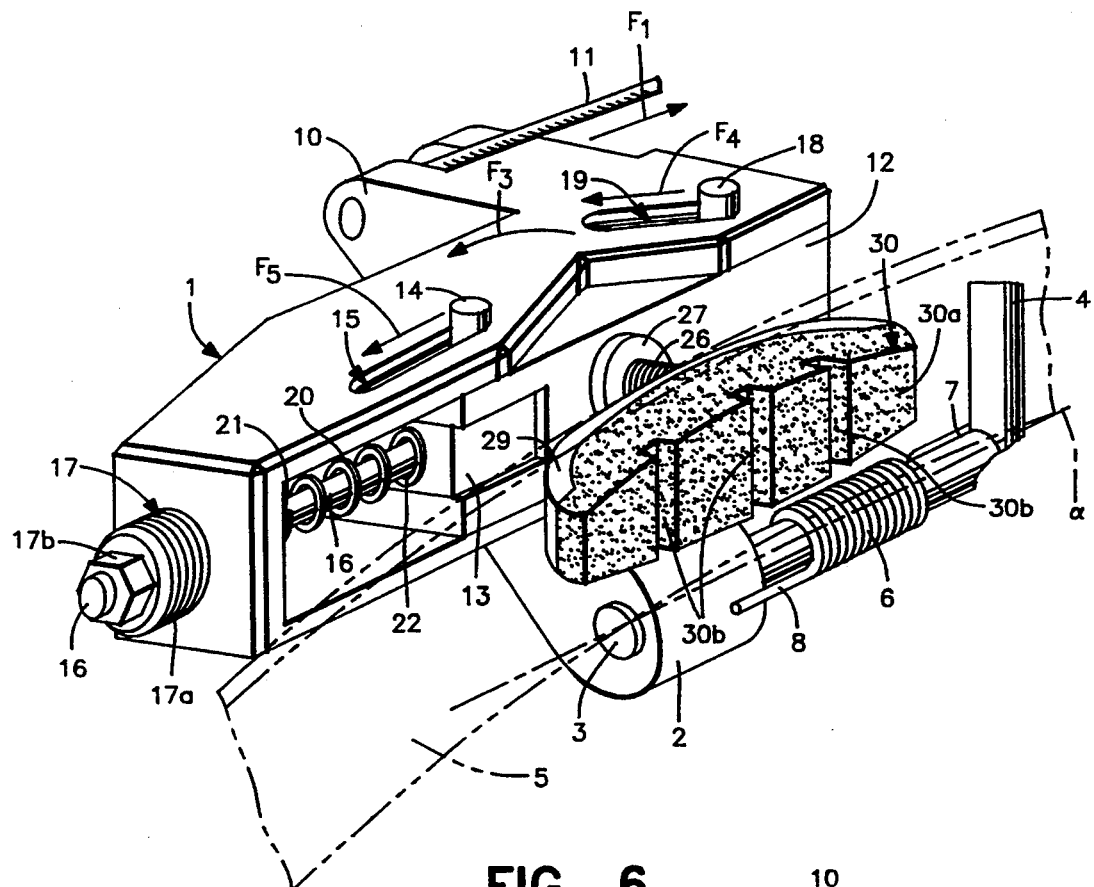
FIGS. 5 and 6 are views similar to FIGS. 1 and 2, respectively, showing the brake head in an active position at the beginning of braking, in which the brake pad is generally parallel to the rim of the wheel of the bicycle and in contact with the rim over the entire nominal surface of the pad.
Figure 6:
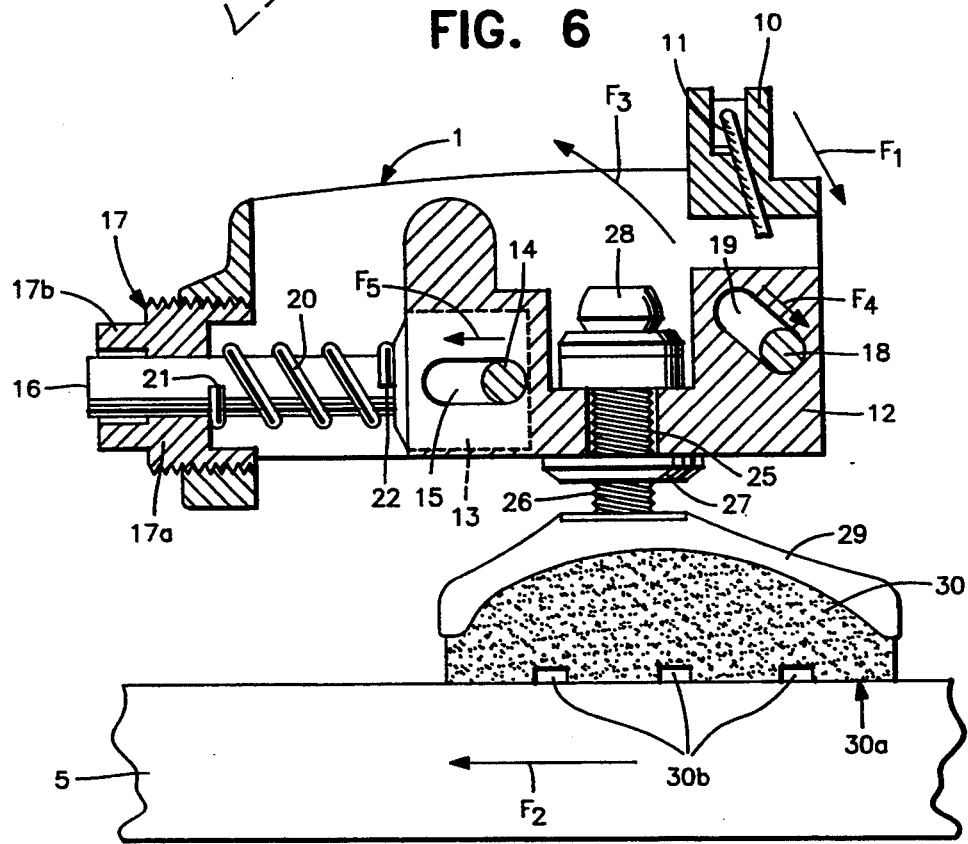

By this angular raising movement, the housing 1 brings the pad 30 into contact with the rim 5 along the entire nominal surface of the useful face 30a, or more precisely along the maximum contact surface between the rim 5 and the pad 30 (FIGS. 4–6).

By "nominal surface" is meant the surface of the face 30a as devised and executed, i.e. taking into account any grooves 30b which have the effect of reducing the total theoretical surface area resulting from only the outer contour of the useful face 30a.

As the user further actuates the control lever, the tension on the cable 11 is increased and the compressive force of the pad 30 on the rim 5 is increased, thereby intensifying the braking.

However, contrary to the situation with known brakes, it is not possible for the wheel to lock as now described. The friction of the rim 5 rotating against the immobile pad 30 tends to cause a sticking together of the rim 5 and pad 30, the pad 30 tends to arrest the movement of the rim 5, and the rim 5 tends to carry the pad 30 along in the direction of arrow F2 which indicates the direction of movement of rim 5.

Naturally, instantaneous stopping does not occur; the pad cannot immobilize the rim 5. However, the other effect does occur—the pad 30 is urged forward by the rim 5.

Figure 7:
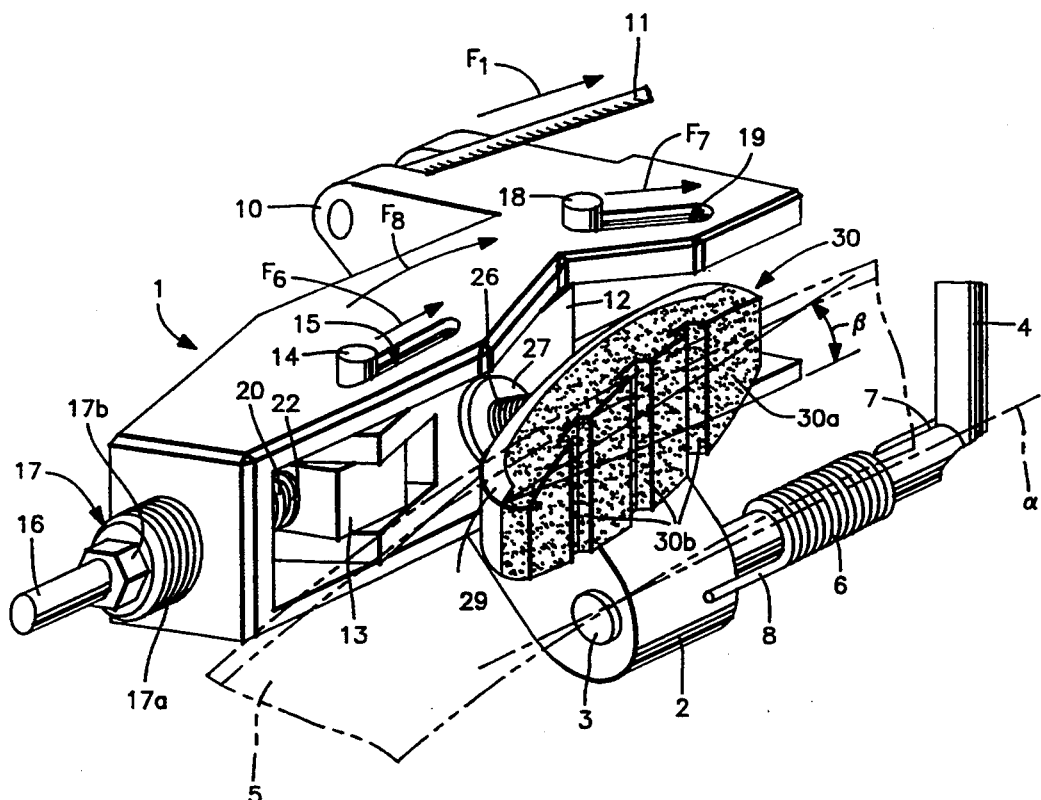
FIGS. 7 and 8 are views similar to FIGS. 1 and 2, respectively, showing the device in a pivoting position corresponding to release of the braking action.
Figure 8:
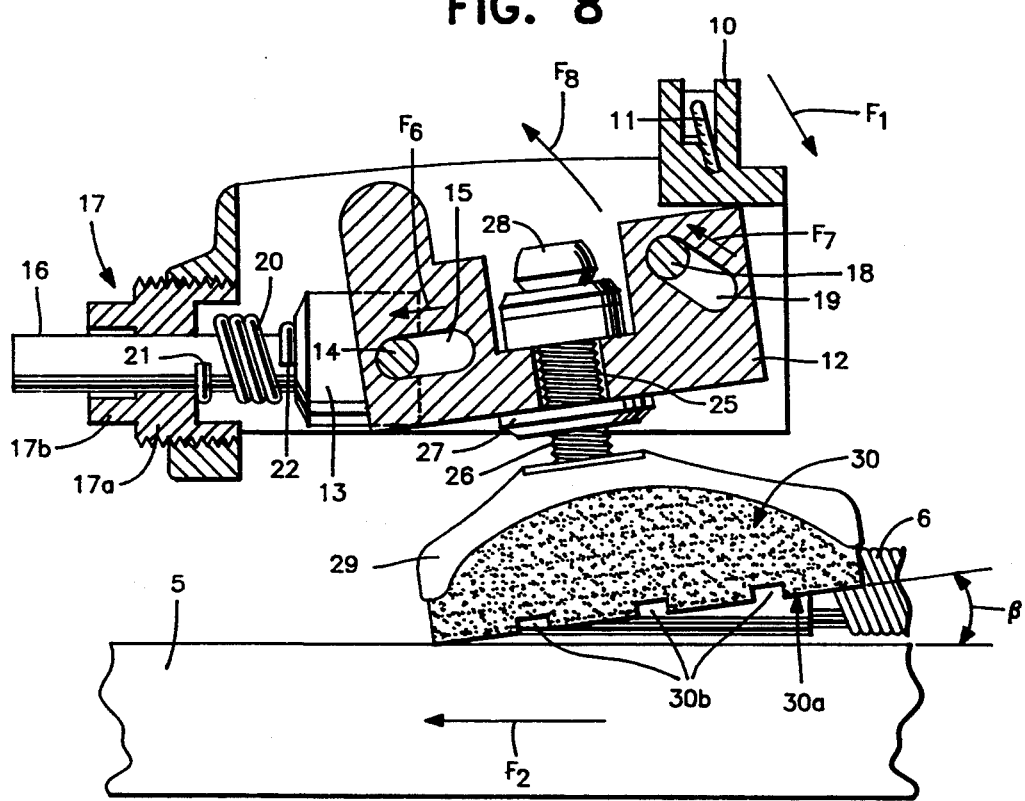

The inventive device is intended to take advantage of this potential movement and to facilitate the displacement of the pad 30 in the natural direction therefor. In allowing the piece 12 to yield under the force of urging in direction F2, the rod 26, mount 29, and pad 30 are allowed to pivot in the horizontal plane to produce an angle β between the useful face 30a and the plane of the rim 5, as seen in FIGS. 7–8.

It is provided that this pivoting of the pad 30 will only result if the compressive force on the rim 5 has reached a predetermined value which is deemed critical, as will be discussed further infra.

The dispositions of the openings 15 and 19 are such that the piece 12 when retracting the pad 30 executes a movement (best seen in the plan views of FIGS. 2, 6 and 8) which is not a circular movement centered on a single axis but an elliptical movement as indicated by arrow F3 (FIGS. 5–6) the piece 12 is advanced in openings 19 and 15 due to the obliquity of opening 19, and it causes compression of spring 20 via sliding piece 13 which by virtue of being pivotally connected to piece 12 is pushed by piece 12. Thus the arrow F3 represents the resultant of arrows F4 and F5 indicating the direction in which the pins 18 and 14 are displaced in the openings 19 and 15, respectively (FIGS. 5–6).

These kinematics are only operative under the effect of the drawing along of the pad 30 by the rim 5, and against the resistance of spring 20. In adjusting the force of the spring 20 one is setting a basic parameter of the device, because one is coordinating the pivoting movement of the pad 30 with a predetermined pressure force between the pad 30 and the rim 5.

To regulate the equilibration force of the return means, i.e., to adjust the initial force of spring 20, the piece 17 is maneuvered via the hex head 17b such that part 17a is screwed more or less into and out of the housing 1.

The more force exerted by spring 20 by adjustment of piece 17 inwardly the more the excursion of piece 13 is shortened by opposition of spring 20, and the greater will be the maximum compression force allowed between the rim 5 and the pad 30.

The less force exerted by spring 20 the greater the excursion of piece 13, and the lesser will be the maximum compression force allowed between the rim 5 and the pad 30.

The adjustment of the piece 17 via the hex head 17b is very simple, and it is possible to correct the force of the spring 20 to adapt as desired to the terrain conditions, weather conditions, etc.

With known devices, the compression force between the moving element (here the rim 5) and the brake pad is exerted freely and can readily cause locking of the wheel. According to the invention, as the compression force is increased the pad 30 is progressively withdrawn so as to maintain the friction force below the critical threshold at which the wheel can be locked.

The pivoting of the pad is not sudden, and the pad is not necessarily displaced to the maximum angle β [i.e., β(max)] all at one time. The opposing force of spring 20 is permanent, and the pad 30 may even move back and forth to increase or decrease the (instantaneous) angle β when the compression force between the rim 5 and the pad 30 varies, particularly when the condition of the surface on which the wheel is rolling changes, e.g., when the bicycle or the like is of the "all terrain" type.

If, or when, the force exerted by the rim 5 becomes weaker than the force of extension exerted by the spring 20, the spring 20 pushes the piece 13 bearing the pin 14 along the opening 15 in the direction of arrow F6, which forces the piece 12 to align against the rim 5 as pin 18 on piece 12 moves along opening 19 in the direction of arrow F7 (FIGS. 7, 8). The clockwise elliptical movement which results from this is indicated by arrow F8.

The inevitably schematic and static character of the drawings should not obscure the fact that the pad 30 is comprised of a relatively elastic material, such that the retraction of the pad 30 does not proceed strictly according to its geometric forward edge as suggested by the rigorous linearity of the face 30a in FIG. 8. In reality, the pad 30 is "rolled away" to a slight degree as it is retracted from the rim, in the manner of the sole of a shoe during walking, and the part of the pad which is pressed against the rim 5 is slightly deformed, so that there is always a surface of contact (however weak) even when the angle β is at its maximum.

Until the compression force attains the threshold value corresponding to the basic setting of the spring 20, the pad 30 rests in the maximum compression position represented in FIGS. 5-6, such that the friction never falls below the value which should prevail. The compression force of the pad 30 is not decreased unless or until the compression force reaches a high value subject to control, and as this force is later reduced the pad is returned to a fuller engagement position.

When the user ceases to actuate the control lever of the brake, the movable pieces 12 and 13 are returned to their inactive positions of FIGS. 1–3, and the spring 6 returns the housing 1 from the position of FIG. 4 to the position of FIG. 3.

It goes without saying that the invention is applicable to all types of brakes, and not only to brakes on two-wheeled vehicles.

Also, one skilled in the art is capable of employing means equivalent to those described; this is particularly true regarding elastic return means comprised of spring 20 in the above description, which may be realized in a variety of ways in practice. For example, one may substitute an elastomeric piece having its own elasticity for the spring 20, e.g., a piece such as is known commercially under the name "Silent Bloc". Or pneumatic and/or hydraulic means may be provided, etc. The choice of these means depends on considerations of price, weight, space and complexity. Thus, e.g., one will not employ the exact same embodiment for an "all terrain" vehicle as for a large displacement motorcycle.

As an alternative, the elastic means of achieving the return of the pad 30, and of elements which bear the pad, here the rod 26 and the mounting 29 may be disposed elsewhere than between the sliding piece 13 and the interior of the piece 17.

We claim:

1. A method of braking a moving element such as a vehicle wheel comprising:
   providing at least one braking element having a braking surface engageable and disengageable with a contacting surface on the moving element;
   moving said braking element into contacting engagement with said contact surface on said moving element;
   applying a force to said braking element to produce a compression force between said braking surface and said contact surface for producing a frictional force retarding rotation of said wheel;
   providing a predetermined threshold value of said compression force; and
   upon application of said predetermined threshold value of said compression force reducing the area of contact between said braking surface and said contact surface of said wheel to prevent locking of said wheel by said braking element without reducing said friction force to zero during said braking.

2. The method as claimed in claim 1 and further comprising:
   pivotally mounting said braking element on a housing member so that when said braking element is in contacting engagement with said contact surface on said moving element under said threshold value of said compression force rotation of said moving element displaces said braking element angularly with respect to said moving element thereby producing a change in said area of contact between said braking surface and said contact surface of said moving element to effect reduction of said friction force; and
   applying an elastic force on said braking element in opposition to said displacement to thereby provide equilibration.

3. A braking device for a wheeled vehicle having a moving element thereon engageable with a brake pad including a housings, at least one brake pad having a braking surface thereon pivotally mounted on said housing between an inactive position where said at least one brake pad is in spaced non-engaging relationship with a contact surface on said moving element and an active position where said at least one brake pad is in contacting engagement with said moving element, and means for moving said at least one brake pad between said inactive and active positions, comprising:
   pivotable brake pad mounting means between said at least one brake pad and said housing to facilitate pivotal movement of said at least one brake pad with respect to said housing between an incipient braking position where said braking surface on said at least one brake pad is substantially parallel to said contact surface on said moving element and in contacting engagement with said contact surface on said moving element over an entire nominal braking surface on said at least one brake pad and a further braking position where at least part of said braking surface of said at least one brake pad is disposed at an angle with respect to said contact surface on said moving element so that said braking surface is in contacting engagement with said contact surface over a surface area substantially less than the surface area of said nominal braking surface; and
   elastic force means between said housing and said at least one brake pad for urging said at least one brake pad toward said active position.

4. The device as claimed in claim 3 wherein:
   said pivotable brake pad mounting means comprises at least one brake pad mounting element slidably engaging said housing;
   pivot means for pivotably mounting said at least one brake pad mounting element on said housing; and
   guide means for guiding said at least one brake pad mounting element for pivotal sliding movement relative to said housing.

5. The device as claimed in claim 4 wherein said pivot means comprises:
   pivot pin means connecting said elastic force means to said at least one brake pad mounting element for relative pivotal movement therebetween.

6. The device as claimed in claim 5 wherein said guide means comprises:
   first slot means in said housing, said pivot pin means engaging in said first slot means for relative sliding and guided movement therein;
   second slot means in said housing;
   guide pin means in said at least one brake pad mounting element and extending into said second slot means for sliding guided movement therein, said guide means and pivot means cooperating to facilitate movement of said at least one brake pad mounting element between said incipient and further braking positions.

7. The device as claimed in claim 6 wherein:
   said elastic force means comprises:

a pressure member slidably mounted on said housing and slidably engaging said at least one brake pad mounting element; and spring means between said housing and said pressure member for resiliently urging said pressure member and said at least one brake pad mounting element toward said active position.

8. The device as claimed in claim 7 and further comprising:

a first cavity in said housing, said at least one brake pad mounting element being slidably disposed in said first cavity; and a second cavity in said at least one brake pad mounting element, said pressure member being slidably disposed in said second cavity.

9. The device as claimed in claim 8 wherein:

said spring means comprises a compression spring; and adjustable means is adjustably mounted in said housing in sliding engaging relationship with said pressure member for adjusting the compression of said spring for setting a threshold value of compression force exerted on said moving element by said at least one brake pad when in said active position.

10. The device as claimed in claim 9 wherein:

said pressure member comprises a block member slidable in said second cavity and a cylindrical rod extending from said block member;

said adjustable means comprises an adjustable element rotatably mounted in said housing and in relative rotatable engagement with said cylindrical rod; and said spring is disposed between said adjustable element and said block member.

11. The device as claimed in claim 3 wherein said pivotable brake pad mounting means comprises:

at least one brake pad mounting element pivotally mounted on said housing for pivotal movement between said incipient braking position where said braking surface of said at least one brake pad in said active position is parallel to said contact surface on said moving element and said further braking position where said braking surface on said at least one brake pad in said active position is non-parallel to said contact surface on said moving element at said angle with respect thereto for producing said reduction in said surface area contact between said brake pad braking surface and said contact surface on said moving element for reducing frictional force on said contact surface by said at least one brake pad to prevent locking of said moving element.

12. The device as claimed in claim 11 wherein:

said elastic force means is disposed between said housing and said at least one brake pad mounting element.

13. The device as claimed in claim 12 wherein:

said elastic force means comprises a spring means.

14. The device as claimed in claim 12 wherein:

said elastic force means comprises a solid elastic element of an elastomer material.

15. The device as claimed in claim 12 wherein:

said elastic force means comprises a spring means; and further comprising:

adjustable means adjustably mounted on said housing in engagement with said spring means for setting an initial compression of said spring means.

16. The device as claimed in claim 12 wherein:

said elastic force means comprises adjustable means mounted on said housing for setting a threshold value of compression force exerted on said moving element by said at least one brake pad when in said active position.

17. The device as claimed in claim 3 wherein:

said elastic force means comprises adjustable means mounted on said housing for setting a threshold value of compression force exerted on said moving element by said at least one brake pad when in said active position.

* * * * *